United States Patent [19]

Isaacs et al.

[11] 4,191,328

[45] Mar. 4, 1980

[54] INTEGRAL THERMOSTAT-DIGITAL CLOCK UNIT

[75] Inventors: Roger H. Isaacs, Staten Island; David Sandelman; Daniel E. Shprecher, both of Brooklyn, all of N.Y.

[73] Assignee: Rapidcircuit Corp., Brooklyn, N.Y.

[21] Appl. No.: 829,904

[22] Filed: Sep. 1, 1977

[51] Int. Cl.² .......................... F23N 5/20; G05D 23/00
[52] U.S. Cl. ...................................... 236/46 R; 236/47; 236/94; 165/12; 340/309.4
[58] Field of Search .................. 236/47, 46 R, 94, 51; 165/12, 11; 58/152 R, 752 A; 307/141; 340/309.4; 219/506, 492; 364/569, 418

[56] References Cited

U.S. PATENT DOCUMENTS

| | | | |
|---|---|---|---|
| 3,166,742 | 1/1965 | Sherwin | 340/309.4 |
| 3,251,549 | 5/1966 | Hewitt, Jr. et al. | 236/94 X |
| 3,599,863 | 8/1971 | Planckaers | 236/46 R |
| 3,620,448 | 11/1971 | Nelson | 236/46 R |
| 3,785,165 | 1/1974 | Valenzuela | 62/158 |
| 3,819,906 | 6/1974 | Gould, Jr. | 307/141 X |
| 3,948,441 | 4/1976 | Perkins et al. | 236/46 R |
| 3,964,677 | 6/1976 | Schalow et al. | 236/46 R |
| 3,979,059 | 9/1976 | Davis et al. | 236/46 R |
| 4,013,219 | 3/1977 | Jacobson | 236/46 R |
| 4,049,193 | 9/1977 | Haviland et al. | 236/47 X |
| 4,071,745 | 1/1978 | Hall | 165/11 X |
| 4,078,720 | 3/1978 | Nurnberg | 165/12 |
| 4,106,690 | 8/1978 | Tomlinson | 165/12 |

*Primary Examiner*—William E. Wayner
*Attorney, Agent, or Firm*—Peter L. Berger

[57] ABSTRACT

An integral thermostat and digital clock is disclosed which operates with conventional two-wire systems connected between the thermostat and remotely operated relay. The two wires are used to carry a control signal from the thermostat to the remote relay and power to the integral unit for providing timing signals and power. The integral unit has a combined display which can be used for the time of day or temperature and separate day and night time settings are provided for changing the control of the thermostat according to the users' needs.

12 Claims, 3 Drawing Figures

INTEGRAL THERMOSTAT-DIGITAL CLOCK UNIT

BACKGROUND OF THE INVENTION

This invention relates to a thermostat, and more particularly to a thermostat used in combination with a clock.

With the increasing and spiralling costs of fuel and this nations's committment to conservation, greater attention has been focused on the principal regulatory mechanism found in most homes for heating and cooling, the thermostat. Thermostats are temperature sensitive units which generally operate a remotely located relay by providing control signals over a pair of wires to close or open the relay as appropriate. By the opening or closing of a relay, an appropriate heating or cooling mechanism is actuated to alter the ambient temperature in the environment of the thermostat, thus providing the user with a desired temperature level.

Some thermostats also have clocks provided thereon for displaying the time of day. As described above, there are generally a pair of wires between a thermostat and the remotely operated relay, and this pair of wires carries the control signals between the thermostat and relay. When clocks are added to the thermostat, an additional third wire is required to provide power to the clock. As can be appreciated, such a third wire complicates the installation, is more expensive, and generally limits the installation to only those having expertise in the thermostat field. Some attempts have been made to eliminate the need of a third wire, and these attempts have included the use of a battery located within the thermostat-clock unit to provide power for the clock. Clearly, such an approach has its limitations, since batteries need replacement, are expensive, and when considered in light of the lifetime of the thermostat, can become much more expensive than the thermostat itself.

Thermostats generally display only limited information, such as the temperature and time of day. Frequently, the user does not know whether or not the heating or cooling unit is operated, and often when it is desired to heat a room, the user will move the desired thermostat setting much higher than appropriate because the user may be unaware that the heating unit is operating. In some units, the heating unit is operated after a delay time, so that this over setting of the desired temperature is inappropriate and causes unnecessary and wasteful consumption of fuel.

Some thermostats have the abilities to have separate day and nighttime desired temperatures set, and these are automatically operated as the appropriate times are reached. In some cases, the user may want to temporarily change the time of switching from day to nighttime control, and this can only be done by altering the daytime setting. Thus, if the user were leaving home for the night at 4:00 p.m., it would be undesirable for the ambient temperature to be maintained at a daytime level. Consequently, for that one night, it would be preferable to change the time of actuating the nighttime control to 4:00 p.m. rather than that which had previously been set. With currently available controls, this can only be done by reducing the daytime control at 4:00 p.m., which setting is then maintained fixed until changed. As a consequence, in many cases, the user forgets to alter the daytime level before leaving, or alter it after returning so that inappropriate and wasteful usage of the heating or cooling mechanism may occur.

An object of this invention is to provide an integrated thermostat-clock unit which may be installed by the home owner using only the conventional two wires employed.

Another object of this invention is to provide such a combined thermostat-clock unit which is more efficient regarding the use of energy.

Yet another object of this invention is to provide such a unit which is dependable, reasonably priced, and easy to install, whether by an expert or by an amateur.

Another object of this invention is to provide a thermostat which is capable of switching from day to nighttime control for a single time period, and automatically revert to the time controls previously set.

Still another object of this invention is to provide such a unit which is capable of displaying the condition of the heating or cooling unit, whether or not said unit has actually yet begun to operate.

Another object of this invention is to provide such an integral unit which is capable of displaying a number of functions such as time, temperature, whether in degrees Fahrenheit or Centigrade, nighttime setting, daytime setting, and the desired nighttime and daytime temperature levels.

Another object of this invention is to provide such a display which is easy to read, attractive, and is in the digital form.

Other objects, features and advantages of this invention will become more apparent from the following description.

SUMMARY OF THE INVENTION

In accordance with the principles of this invention, the above objects are accomplished by providing an integral unit of a thermostat for generating control signals for controlling a remote relay and a digital clock for displaying the time of day which operates with the conventional two wires generally found connected between the thermostat in the room or home of the user and the remotely located relay which operates the heating or cooling unit. This is accomplished by utilizing conventional AC power and rectifying that power to provide said power and timing signals for the clock and other associated functions, while utilizing one portion of a cycle of the AC wave as the control signal causing the remotely located relay to be responsive to the condition of the thermostat. This unique arrangement enables all presently operating thermostats, with or without clocks, to be replaced by the unit described herein by merely using the existing two wires, connecting them to the appropriate terminals in the integral thermostat-clock unit, and connecting the two wires at the remotely located relay through a separate unit which connects with a standard AC outlet. Such an installation will take very little time, is quite simple and safe, and when the unit described herein is installed, will provide significant cost savings and improved functions as to the way energy is utilized in the user's environment.

The integral unit provides a number of other functions which are displayed in an efficient fashion, these functions becoming more apparent as the detailed description is provided hereinafter. One of the functions previously discussed is that relating to the indication that the heating or cooling unit is operated, and an appropriate mechanism is provided at the integral unit displaying that condition. Further, provision is made for controlling the relay according to day and nighttime settings, with there being a means to switch from the day to the night or from the night to the daytime setting for only one sequence.

DETAILED DESCRIPTION

Figure 1:
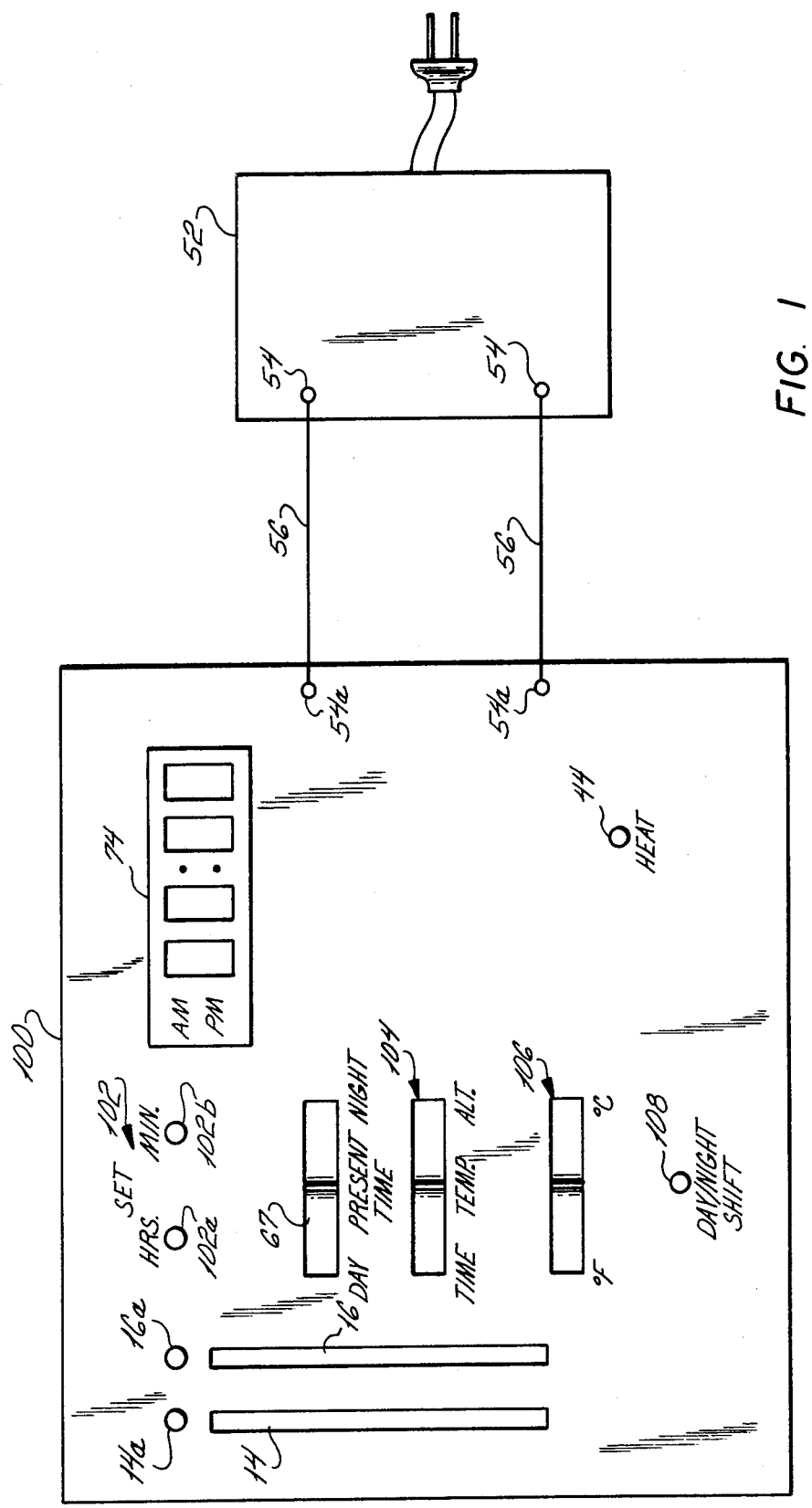
FIG. 1 is a pictorial block view of the integral thermostat-digital clock unit connected to a remotely operated relay control unit.

FIG. 1 is a pictorial schematic of the two principal elements of this invention. The integral thermostat-clock unit 100 is adapted to be mounted on the wall and attached to two wires 56—56 at terminals 54a—54a. The size of the wall unit will be appropriately designed for compact and efficient utilization as well as clear display of the functions controlled. The integral unit 100 is connected through the pair of wires 56—56 to a remote control unit 52 at terminals 54—54. Control unit 52 is connected to a standard source of AC voltage.

The integral unit comprises a display means 74 capable of displaying time, including A.M. or P.M. designations. The display may be of a conventional seven segment type, with four positions being illustrated for purposes of displaying the time or temperature, as desired. The display is a digital-type, and there is provided a setting means 102 to properly set the hours 102a and minutes 102b displayed. A switch 67 is provided to display the present time when in the center position, the daytime thermostat setting when in one positon, and the nighttime thermostat setting when in the other position. Thus, the three position switch 67 is capable of displaying the time at which the night thermostat controls the operation of the remote circuit, and the time at which the day operation supersedes. Related to the day and nighttime settings, there is illustrated setting means 14 and 16 to set the desired temperatures for the day and nighttime controls, respectively. An indicator light 14a is energized when the daytime setting is controlling the thermostat operation, while indicator light 16a is energized while the nighttime temperature setting is controlling.

Another three position switch 104 is illustrated to control display 74 and when in the right hand position the display will show the ambient temperature and time of day, sequentially. When the switch is in its left hand position, the time of day will be constantly displayed, while when in its center position, the ambient temperature will be constantly displayed.

As another feature of this invention, the temperature can be displayed at either degrees Centrigrade or degrees Fahrenheit under control of a two position switch 106.

When the unit 100 issues a control signal to operate the remote circuit contained in unit 52, a heat indicator 44 is energized to display that the heating or cooling function is in operation or about to begin. This information will prevent the user from incorrectly assuming that the heating operation has not yet commenced or is not energized. In this fashion, inapproprate over setting or under setting of desired temperature levels can be eliminated by the operator's merely scanning the unit 100 to determine if the heating or cooling unit is in operation.

In addition to the functions and switches provided in unit 100, a day/night shift push button 108 is employed to change the day/night condition controlling the thermostat from whatever condition it presently is in to the alternate one. Thus, if the thermostat is presently in a daytime control, so that the temperature set by rheostat 14 is controlling, depression of the day/night shift button 108 will immediately change the controlling rheostat to nighttime control 16. The nighttime control will then continue as the supervisory controlling temperature until the normal daytime controlling temperature as set by rheostat 14 is to be switched to the controlling position. Thus, it is possible to alter the controlling temperature for one sequence without moving the rheostat settings, and therefore, the user's specific needs are addressed by the provision of the day/night shift switch and its controlling elements, to be described hereinafter.

One of the features of this invention is the provision of the numbers of independent surpervisory controlling functions contained in unit 100, all of which are easily accessible to the user, prominently and attractively displayed, and easy to use. The number of functions and items to be displayed represents a distinct advantage over anything presently obtainable in the art, and the use of the combined integral thermostat-clock unit 100, operting in conjunction with remote unit 52 over only a pair of wires 56—56 is also unique.

Figure 2A:
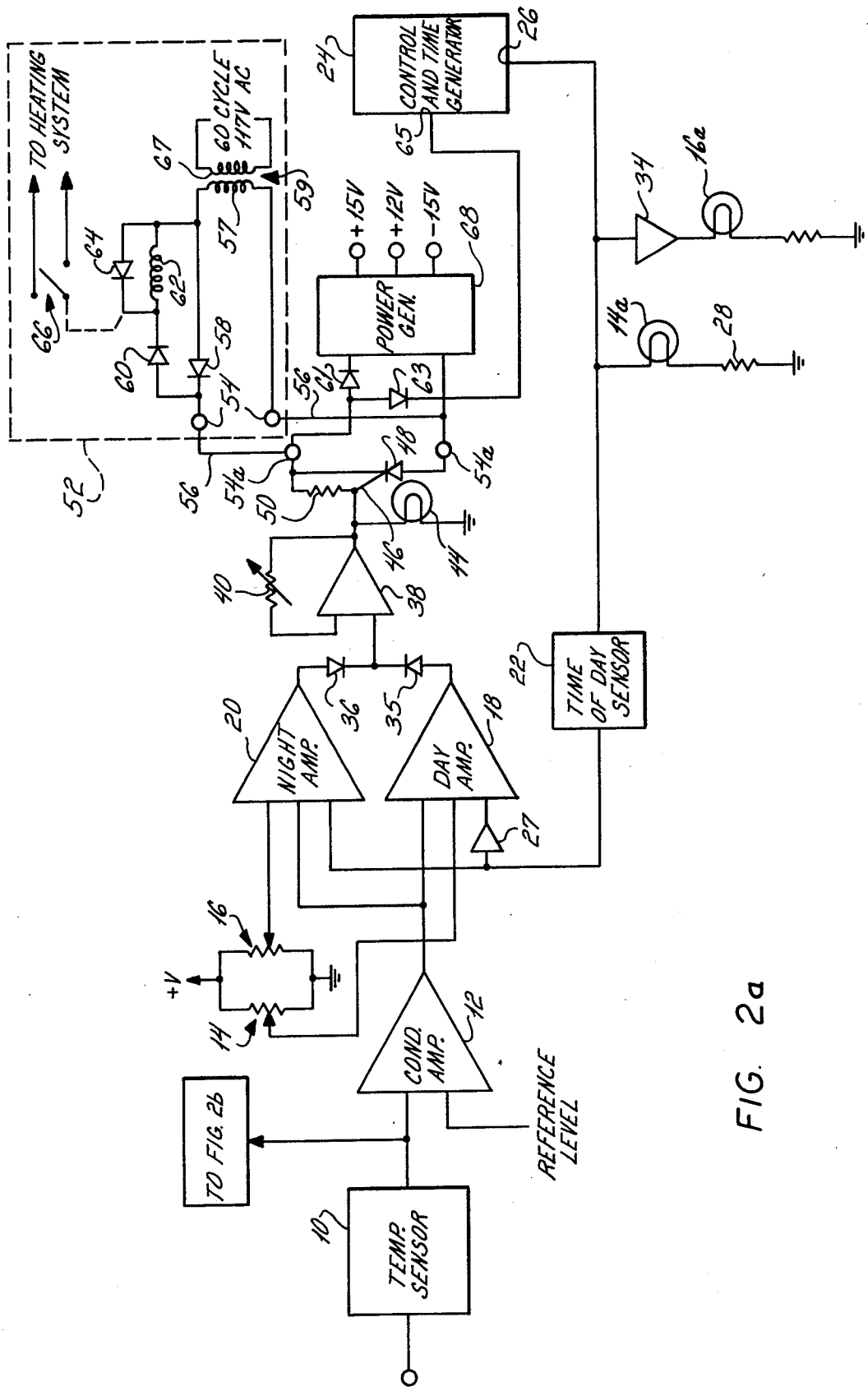
FIGS. 2a and 2b together form a schematic block diagram of an embodiment of the instant invention.
Figure 2B:
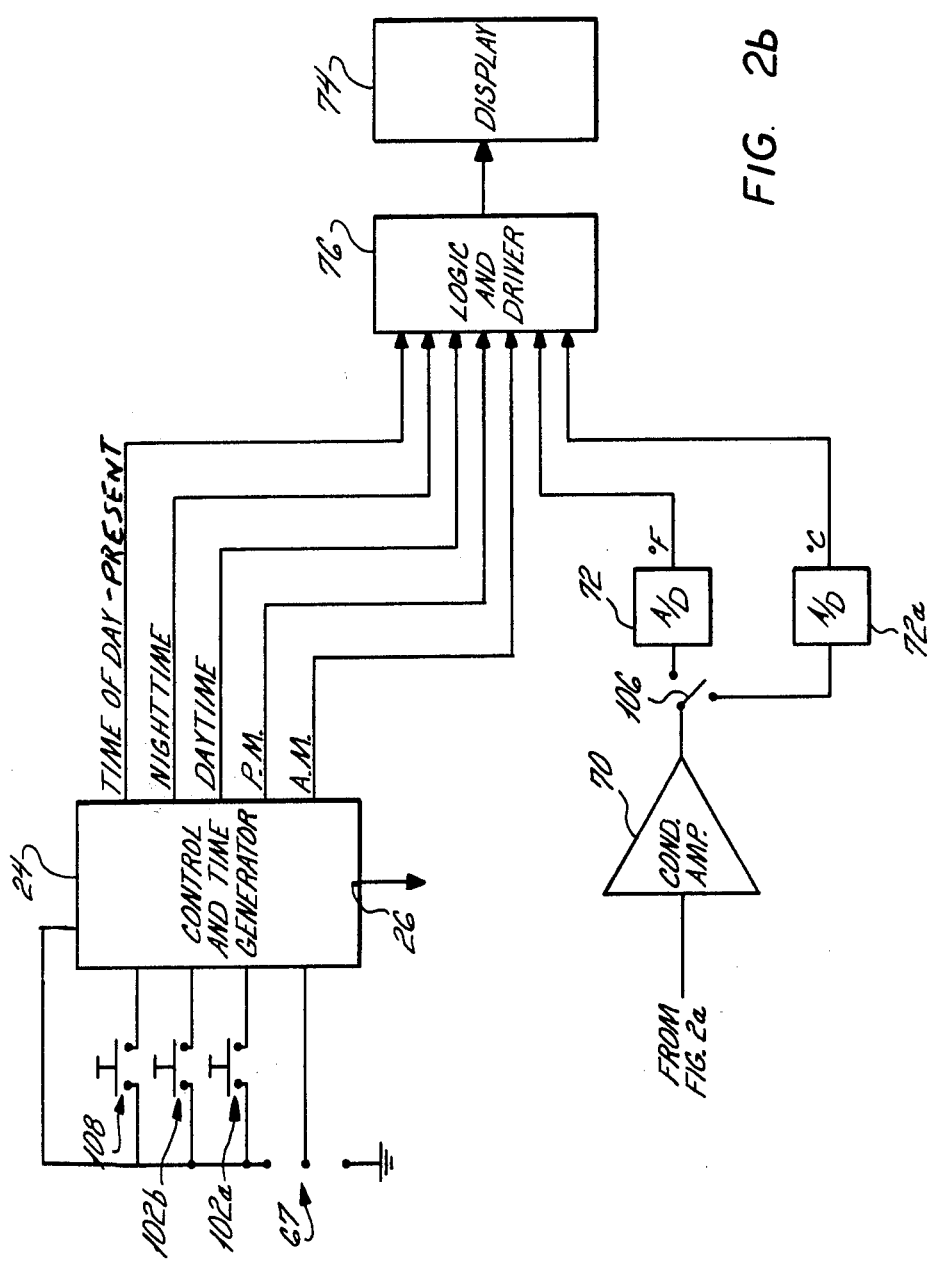

FIGS. 2a and 2b, in combination, are a schematic block diagram of an embodiment of the instant invention. As generally illustrated in FIG. 2a, numeral 52 is directed to a section of the schematic diagram which is located in the remote unit, while the remaining elements are all connected together and contained in the integral unit 100. Numerous conventional symbols are utilized in the schematic diagrams, such as for amplifiers and inverters. Additionally, blocks are utilized to designate those components which are relatively standard and/or within the design capability of one of ordinary skill in the art.

The ambient temperature is sensed at temperature sensor 10, which is a conventional transducer responsive to the temperature level to produce an electrical signal output, which is supplied as one input to two input conditioning amplifier 12. The temperature sensor 10 may be any conventional device such as IC3911. As a design approach utilized in this embodiment, conditioning amplifier 12 is for amplifying the dynamic temperature, and a reference level input is supplied as the second input to conditioning amplifier 12. Thus, the primary function of the amplifier is to amplify the electrical signals produced as a result of the varying temperature rather than producing an output responsive to the absolute magnitude of the temperature level.

The voltage output of temperature sensor 10 is also supplied to the schematic circuit illustrated in FIG. 2b, and this will be discussed in more detail hereinafter.

The output of conditioning amplifier 12, which is a differential amplifier, is supplied as one input to three input day amplifier 18 and three input night amplifier 20, each of which is a differential amplifier. As one feature of this invention, separate controls are provided for setting the day and nighttime temperatures, and rheostats or potentiometers 14 and 16 are employed for this purpose. The output of potentiometer 14 is supplied as one input to day amplifier 18, while the varying output of potentiometer 16 is supplied as one input to night amplifier 20. The third input of night amplifier 20 and day amplifier 18 is a gating input, and either one or the other of said inputs will be energized depending on whether the controlling signal is to be the day or nighttime. In particular, a time of day sensor 22 generates a high or low output responsive to output 26 of control and time generator 24. The output of time of day sensor 22 will indicate whether the control and time generator indicates that the daytime or nighttime control is the present condition. Inverter 27 connected to the third input of day amplifier 18 ensures that when day amplifier is enabled, night amplifier is disabled as well as ensuring the opposite condition.

The control and time generator 24 is a General Instrument IC part number AY-5-1231, which is capable of generating control and time signals when supplied with standard time pulses. Thus, as will be described hereinafter, 60 cycle AC is half wave rectified, and this 60 cycle wave is used as the timing pulse controlling the control and time generator 24 to produce specific clock signals indicating the various times generated within.

Referring to FIG. 2b, some of the control inputs and outputs of the generator are shown in more detail. In particular, the control and timing generator has the ability to produce signals indicating the time of day, and switches 102a and 102b are utilized to set the hours and minutes, respectively. In addition, control and timing generator is capable of producing the time of day as an output, a specific nighttime setting, a specific daytime setting, and the P.M. or A.M. indications, as appropriate. These outputs are standard outputs from said General Instrument IC and other standard off the shelf components may be utilized instead of the General Instrument part. The control and time generator is basically capable of producing clock pulses indicating the time of day and various other times set therewithin for use by a conventional display driver to display the respective times.

The control and time generator 24 supplies an output at 26 which is either high or low depending on whether the output is "nighttime control" or "daytime control", which is set by set selector 67 operating in conjunction with the hours and minutes switches 102a and 102b, respectively. The set selector switch is a three position switch for setting the controlling daytime or the controlling nighttime. In accordance with the actual time setting made, the output at 26 (FIG. 2a) is supplied to time of day sensor 22 for enabling and disabling respective amplifiers 18 and 20. In addition, the high or low output at 26 is used to energize lights 14a and 16a, as appropriate, to indicate that the daytime or nighttime mode is controlling. In particular, the output at 26 is supplied through a filament 14a and resistor 28 to ground for indicating the daytime control is operative, while when the opposite condition is present, invertor 34 causes light bulb 16a to be energized, indicating that the nightime controls are operative.

Considering the above discussion together, it is now clear that the control and time generator 24 enables and disables respective amplifiers 18 and 20, which in conjunction with rheostats or potentiometers 14 and 16 control the temperature sought for respective day and nighttime conditions. The manner in which the thermostatic operation is controlled is hereinafter described. The outputs of day and night amplifiers 18 and 20 are connected together through isolating diodes 35 and 36 as one input to a two input differential amplifer 38. The second input to differential amplifier 38 is used to set the reference level as compared with the input supplied from amplifiers 18 and 20. A variable resistance device, such as potentiometer 40, is connected between the output and second input of amplifier 38 to enable the user to adjust the differential at the input to amplifier 38 which will cause an appropriate signal to be produced. For instance, it may be desired to maintain the ambient temperature within a four degree range, so that potentiometer 40 can be set to allow amplifier 38 to produce its appropriate signal when this predetermined range is exceeded. The signal produced by amplifier 38 is used to control the heating or cooling operation, as will be described hereinafter.

When the input to differential amplifier 38 exceeds the predetermined amount, an output signal is generated which passes through filament or lamp 44, the indicating that a heating or cooling operation is to be energized or in operation. Lamp 44 is also contained on the integral unit 100 (FIG. 1) to signal to the user that such condition is operative. In addition, the operative amplifier 38 is supplied to gating input 46 of SCR 48, the anode of which is connected to terminal 54a, while the cathode is connected to the other terminal 54a of the pair of wires connected between the integral unit 100 and the remote unit 52. In addition, a drain resistor 50 is connected between the trigger gate 46 of SCR 48 and the upper terminal 54a for purposes of turning off SCR 48 after it has been triggered on for a period of time and is in the negative mode.

As briefly set forth above, one of the important advantages and features of this invention is the ability to locate the remote unit 52 from the integral unit 100 and utilize only the conventional pair of wires generally employed. In this fashion, it is necessary to use the pair of wires to generate both a control signal for operating the remote unit and providing power and timing signals to operate the control and time generator 24. The manner in which this is accomplished is set forth hereinafter.

At the remote unit 52, upper terminal 54 is connected through the cathode and then anode of diode 58 to the secondary 57 of a transformer 59, the primary 67 of which is connected to conventional 60 cycle 117 volt AC. Upper terminal 54 is also connected through an anode and cathode of a diode 60 through control winding 62 of remotely operated relay 66 to the secondary 57. A safety diode 64 is connected across winding or coil 62 to prevent spurious spikes from causing damage to the electronics employed. The bottom lead of seconday 57 is connected to the second terminal 54, and terminals 54—54 are connected to terminals 54a—54a through the pair of wires 56—56.

When it is desired to operate the heating or cooling system, the desired temperature differential is generated at amplifier 38 as a result of the processing of the ambient temperature through temperature sensor 10, conditioning amplifier 12, controlling day or night amplifiers 18 or 20, respectively, and SCR 48 is triggered to its "on" position. When this occurs, a complete circuit is provided for the negative wave appearing at the secondary 57 of transformer 59, with the negative half cycle passing through winding 62, diode 60 to SCR 48. When this occurs. winding 62 will be energized causing its associated contact 66 to be moved to its closed position to operate the heating system or cooling system, as appropriate. As long as SCR 48 is conducting, winding 62 will be maintained energized, maintaining the heating or cooling system in operation. When the desired ambient temperature has been reached, the differential input to amplifier 38 will be less than the predetermined minimum value, and the output therefrom will decrease to turn off lamp 44 and operate to turn off SCR 48 through resistor 50. When this occurs, the negative half cycle which previously had passed through winding 62 will be blocked because there will not be a complete circuit to allow said negative half cycle to flow. Consequently, the contact 66 controlled by winding 62 will become open, thus de-energizing the heating system.

The use of a pair of wires to provide a control signal between the integral unit 100 and remote unit 52 is conventional, although the specific embodiment above disclosed is unique and forms an important part of the instant invention, in that the same pair of wires 56—56 are also used to carry power and timing signals to operate generator 24 and the various associated functions and displays. This is accomplished by the provision of diode 58 connected to the secondary 57 of transformer 59, to allow the positive half cycle of the 60 cycle AC to pass through a diode 61 connected to terminal 54a in integral unit 100, diode 61 allowing positive half wave rectified signals to pass to power generator 68, this in combination with diode 58, when both diode 58 and diode 61 are in their forward conducting positions. In a conventional fashion, power generator 68 supplied with positive half wave rectified signals develops the required voltage levels to operate the integrated circuits described above, and for instance, power generator 68 develops voltages of +15, +12, and −15 volts.

In addition to providing the power to operate power generator 68, the 60 cycle half wave rectified signal passes through a diode 63 to input 65 of control and time generator 24. This 60 cycle half wave time signal serves as the basic clock for the control and time generator, allowing it to develop the appropriate time signals to control the operation of the integral unit as time passes.

Referring to FIG. 2b, there is shown another aspect of the invention in which the input to conditioning amplifier 70 is derived as the output from temperature sensor 10. Conditioning amplifier 70 is a conventional differential amplifier and it supplies its output through a two position switch 106 (See FIG. 1) to analog to digital converters 72 and 72a. Analog to digital convertor 72 and analog to digital convertor 72a are relatively conventional and produce digital signals representative of the degrees Fahrenheit or degees Centrigade, as desired.

The control and time generator 24 is shown with various of its outputs indicated, and these are the time of day, nighttime, daytime, P.M., and A.M. The nighttime and daytime outputs are those at which the appropriate nighttime control and daytime control will supervise the operation of the thermostat as set by Potentiometers 16 and 14, respectively. The outputs of control and time generator 24, as well as the outputs of analog to digital converters 72 and 72a are conventional digital signals used to be combined and drive a display 74 through logic and drive means 76. As discussed above, the display 74 (See FIG. 1) is capable of displaying any of several different sets of information upon operation of any of the appropriate switches in integral unit 100. The operation of said switches also controls the logic and drive means 76 in an appropriate fashion to combine the digital signals, as appropriate, to drive display 74. Thus, for instance, when the time of day is in the P.M. mode, logic and driver means will provide an output to display simultaneously the time of day and the respective A.M. or P.M. condition. Similarly, when the alternate switch 104 is employed, the logic and drive means will be operated to in one sequence display the time, and in another sequence display the ambient temperature whether in degrees Centigrade or Fahrenheit, as determined by switch 106.

As another feature of this invention, control and time generator includes a day/night shaft switch 108 which is operative to alter the output appearing on output 26 of generator 24 as has been described previously, and it should be understood that the day/night shaft switch only changes the state for one sequence or as many shifts as desired, but will be overridden by clock signal generator 24. Thus, if the normal nighttime setting is 11:00 P.M., and the user wants to have the nighttime condition control from 4:00 P.M. on, the user merely presses the day/night shift switch 108 at 4:00 P.M. The next evening, the normal nighttime control will again be operative.

This invention has been described by way of the preferred embodiment illustrated above. Numerous blocks are employed and illustrated, such as for differential amplifiers, temperature sensors, power generators, and control and time generator. These have been referred to as standard IC chips, and specific designation of those chips has been set forth. The differential amplifiers are believed conventional enough so that specific identification of them is unnecessary. In addition, the general functional description of the logic and driver 76 as well as the display 74 is believed adequate to enable one of ordinary skill in the art to choose and select a suitable combination of a logic and driver means 76 to combine the various inputs thereto and drive a suitable display 74. As described above, the display utilized in the present system is a 7 element display, but any suitable digital display could be employed.

What is claimed is:

1. A room unit thermostat connected by only two wires with a remotely controlled circuit for controlling the supply of warm or cold air to alter the ambient temperature in said room, said room unit comprising display means to display the time of day and the ambient temperature, clock means to generate said time of day connected to said display means, and power means connected to said two wires for supplying timing signals and power to said clock means and power to said thermostat, said thermostat supplying a control signal on said two wires for controlling said remotely controlled circuit, further comprising daytime temperature control means and nighttime temperature control means, logic means connected to said clock means and comprising means to enable said daytime control or said nighttime control, said logic means being settable to nighttime and daytime settings and comprising means responsive to the time of day being equal to said settings so enabling said respective daytime and nighttime control means.

2. A room unit as set forth in claim 1, comprising rectifier means, AC power connected to said rectifier means, said rectifier means supplying said timing signals and power.

3. A room unit as set forth in claim 2, wherein said remotely controlled circuit comprises plug means adapted to be inserted in a conventional AC socket.

4. A room unit as set forth in claim 2, wherein said control signal is supplied from said thermostat to said remote circuit during the negative half cycle of said AC power signal.

5. A room unit as set forth in claim 1, further comprising indicator means contained in said room unit, said indicator means connected to receive said control signal to energize said indicator means displaying the condition of the heater/air conditioner.

6. A room unit as set forth in claim 1, comprising switch means connected to said logic means to change from either of said nighttime control or daytime control independent of the actual time of day.

7. A room unit as set forth in claim 1, wherein said nighttime and daytime settings are connected to said display means, further comprising switch means to display said time of day, said daytime and said nighttime settings.

8. A room unit as set forth in claim 3, wherein said remotely controlled circuit comprises a transformer and a diode for rectifying said AC, said diode being biased to permit current to flow in one direction to serve as said power for said room unit thermostat and permit current to flow in the opposite direction to energize heating/cooling means to alter the ambient temperature.

9. A room unit thermostat connected by only two wires with a remotely controlled circuit for controlling the supply of warm or cold air to alter the ambient temperature in said room, said room unit comprising display means to display the time of day and the ambient temperature, clock means to generate said time of day connected to said display means, and power means connected to said two wires for supplying timing signals and power to said clock means and power to said thermostat, said thermostat supplying a control signal on said two wires for controlling said remotely controlled circuit further comprising temperature sensor means for sensing the ambient temperature, said temperature sensor means connected to said display means, and switch means connected to said temperature sensor means and said clock means to display alternately said time of day and ambient temperature.

10. An integral unit as set forth in claim 9 further comprising setting means connected to said clock means to set daytime and nighttime switch means, said switch means connected to said setting means for displaying said daytime switch time and said nighttime switch time on said digital display.

11. An integral unit as set forth in claim 10, further comprising daytime temperature and setting means and nighttime temperature level setting means and light means connected to said clock means for displaying which of said level setting means is controlling the thermostat operation.

12. A thermostat system comprising a wall unit for mounting in the area in which temperature is to be controlled and a remotely located circuit for operating a heating/cooling unit, said wall unit comprising means to sense the ambient temperature and generate a control signal responsive thereto, said wall unit further comprising a control generator housed within said wall unit operative to control several functions of said thermostat system, said control generator comprising solid state electronics and issuing electronic command signals to operate said thermostat system, a sinusoidal power source connected to said wall unit for supplying power and timing signals for said thermostat system, said sinusoidal power source comprising conventional AC located at said remotely located circuit, further comprising two wires only connected between said wall unit and said remotely located circuit, and rectifier means at said remotely located circuit connected to said conventional AC to permit power to be supplied to said wall unit on one-half cycle and control signals to be carried from said wall unit to said remotely located circuit on the other half cycle to control said heating/cooling unit.

* * * * *